Dec. 31, 1968
J. RABINOW
3,418,965
METRIC-ENGLISH CONVERTER FOR MACHINE TOOLS
WITH AUTOMATIC SELECTOR
Filed Jan. 11, 1968
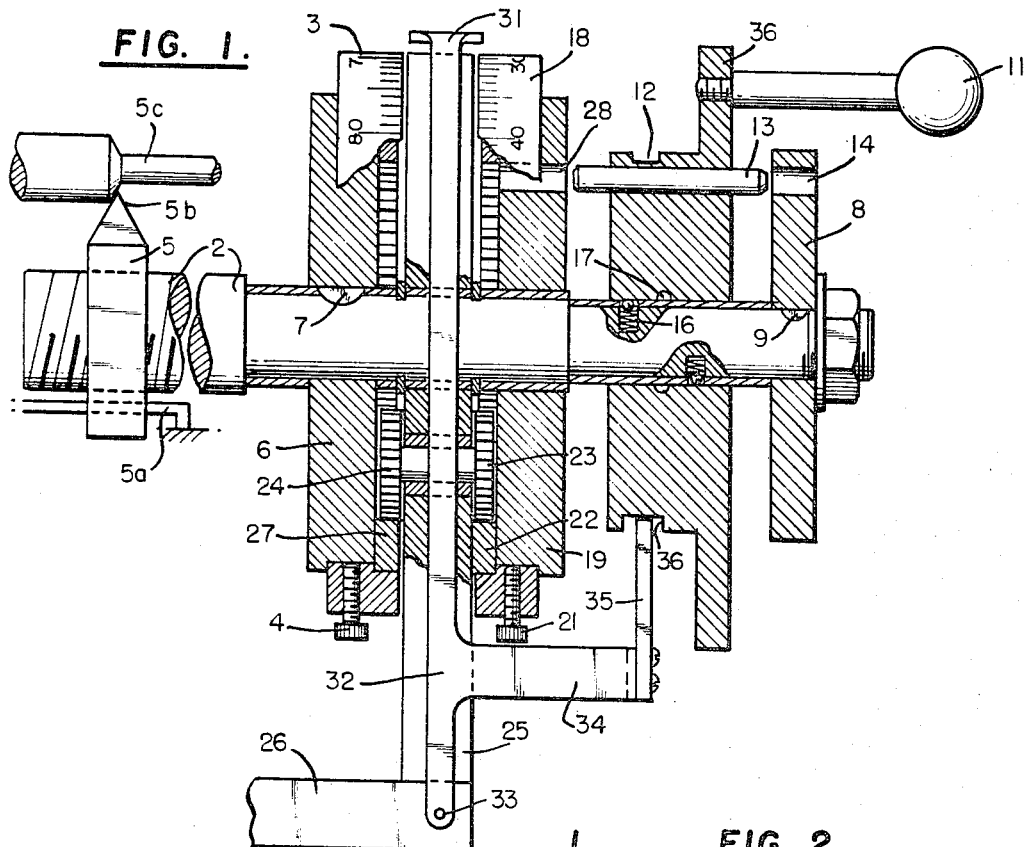
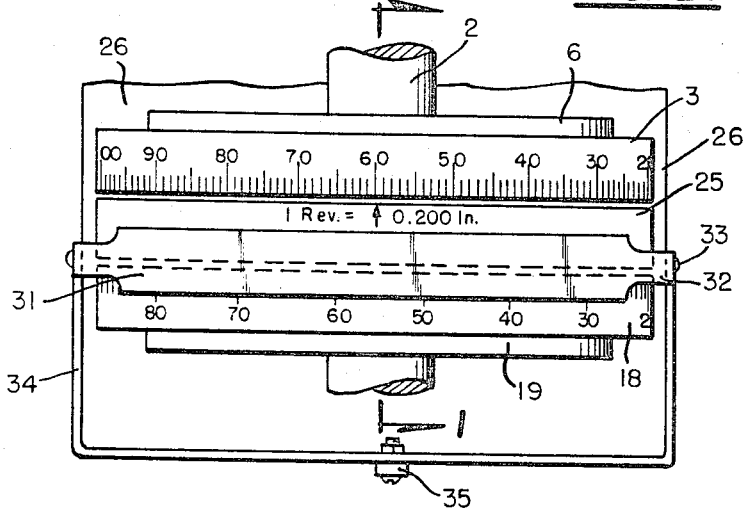
INVENTOR
Jacob Rabinow
BY *Max L. Libman*
ATTORNEY

United States Patent Office 3,418,965
Patented Dec. 31, 1968

3,418,965
METRIC-ENGLISH CONVERTER FOR MACHINE
TOOLS WITH AUTOMATIC SELECTOR
Jacob Rabinow, Bethesda, Md., assignor of ten percent to
Max L. Libman, Reston, Va.
Filed Jan. 11, 1968, Ser. No. 697,186
4 Claims. (Cl. 116—115.5)

ABSTRACT OF THE DISCLOSURE

A machine tool shaft control device having scales in two systems, e.g., English and metric, with a manual drive crank selectively connectible, in two different axial positions corresponding to the two different scales, to the shaft directly or through a gear train such that the same unit motion of the crank in either selected position will produce an amount of shaft rotation corresponding to a unit indication on the selected scale, with means for automatically covering the scale which is not in use.

---

This invention is an improvement on the device shown and described in U.S. Patent No. 3,315,633 to Rabinow, directed to a metric-English converter for machine tools. In the patented device, it is necessary to use a separate coupling pin to engage the manual drive crank for operation with the selected scale, and since both scales are near each other and both remain in view of the operator, it is easy to read the wrong scale and spoil the work. This is not possible with the present invention, which also provides a simpler and more convenient scale-selecting mechanism than that of the prior patent.

The prior patent (3,315,633) provides a control device for the rotary shaft of a machine tool such as a lathe, milling machine, etc., in which rotation of the shaft adjusts the relative position of a work tool (such as a cutting or grinding tool) and the workpiece on which the tool is working. A manually controlled crank (or handwheel) is usually provided for rotating the shaft, and a scale indicating device is attached to the shaft, the arrangement being such that when the crank is given a full turn, the workpiece moves a unit distance, which is usually a simple fraction of a unit of length of the system employed; e.g., in the English system used in this country and England, it is common to have the drive ratio such that a full rotation of the crank, which is fixed to the shaft, produces 0.200 inch of motion of the tool relative to the workpiece. Thus the operator can produce an inch of such relative motion by giving the wheel five full turns— smaller fractions than 0.200 inch can be read on the scale-indicating device, which may have 200 uniform marks, so that the work can readily be adjusted to 0.001 inch. In the metric system, it would be desirable to have a full crank turn correspond to a unit relative motion of the tool and workpiece of, say, 5 mm., which is fairly close to one-fifth of an inch, in the ratio of 125 to 127, so that the user can operate the crank in the same convenient manner. The prior Rabinow patent provides two scales, e.g., English and metric, and the crank can be selectively connected to one scale (the original scale of the machine) directly, so that it can be used as originally intended; however, when the other scale is used, the crank is connected to the shaft through a gear train having the desired 125:127 ratio so that again a full turn of the crank provides a unit amount of relative motion (5 mm.) of the worktool. This is done in the device of the prior patent by moving a pin from one position to another, which is relatively inconvenient. Furthermore, both scales remain visible to the user, and as they are close together, it is easy for the operator to read the wrong scale and spoil the work. These advantages are obviated in the present invention, by which the change from one system to the other is accomplished by simply sliding the crank axially between two positions, each corresponding to operation in one or the other systems, while at the same time a scale cover moves so as to automatically cover the scale which is not used, so that it is impossible to read the wrong scale.

The specific nature of the invention as well as other objects and advantages thereof will clearly appear from a description of a preferred embodiment as shown in the accompanying drawing, in which:

FIG. 1 is a sectional view of the invention taken on line 1—1 of FIG. 2; and

FIG. 2 is a top plan view of the scales and cover, with the handwheel removed to show the bail construction.

The conversion device is preferably mounted on shaft 2, which may be a shaft of the lead screw of a machine tool or may be an additional extension shaft attached to such lead screw shaft. While construction will vary in accordance with the type of tool, the drive principle may be illustrated by the conventional situation where the shaft 2 is threaded at its end and carries a nut 5 constrained by a fixed guide bar 5b and carrying a tool 5a which operates on a workpiece 5c. Conversely, as is well known, the nut may carry a workpiece against a stationary or rotating tool such as a grinder, milling cutter, etc. In any event, it will be apparent that rotation of shaft 2 will control the longitudinal relative position of the tool and workpiece. It is assumed that the machine tool was originally designed for use in the English system. A conventional English scale 3 is therefore fixed directly to the shaft in a suitable manner, as by a set screw 4 attached to disc 6 which is keyed to the shaft as indicated at 7. The set screw 4 is provided so that the scale may be adjusted for zero setting, as is well known. At the other end of the shaft 12 a fixed disc 8 is also keyed to the shaft as indicated at 9. A hand crank 11 is fixed to disc 12 which is both rotatable and slidable on shaft 2, pin 13 being also fixed to disc 12. When the crank assembly is slid to the right as shown in FIG. 1, pin 13 will snugly fit into aperture 14, and will be held in place by detent 16 engaged in annular slot 17, so that rotation of the crank 11 will turn shaft 2 directly, and with it English scale 3. In this condition, the device will operate essentially in its original fashion, and a full turn of the crank will advance the worktool (not shown) a unit distance such as 0.200 inch.

When it is desired to operate in the metric system, the crank assembly is axially slid to the left so that pin 13 disengages from disc 8. A metric scale 18 is attached to disc 19 by means of set screw 21. A ring gear 22 is fixed to disc 19 and meshes with a pinion gear 23 which is fixed to a similar pinion 24 for rotation therewith, the pinion gear assembly being mounted in suitable bearings in frame 25 which is fixed to plate 26, which is attached to the machine tool in any convenient manner. Pinion 24 cooperates with ring gear 27 which is fixed to disc 6. It is thus apparent that when disc 19 and its attached scale 18 are rotated on shaft 2, the shaft will be driven in a manner dependent on the ratio of the gear train 22–27, which in this case is set to be 125:157, which is the desired ratio for conversion from metric into English units.

Disc 19 is driven by crank 11 which has been previously disengaged from disc 8. It will be understood that aperture 28 in disc 19 will not normally be opposite aperture 14, so that crank disc 12 will normally sit between the two discs with pin 13 abutting against the surface of disc 19 until the crank is rotated sufficiently for pin 13 to engage aperture 28. When pin 13 engages aperture 28 and disc 19, rotation of the crank 11 will cause the disc to rotate, and due to the above-described gear train, a full turn of the crank 11 will produce the proper amount of rotation of shaft 12 to advance the machine tool a unit distance in the metric system, in this case 5 mm.

In addition to the above simplified means for selecting the desired scale, means are provided for covering the scale which is not in use. This is accomplished by providing a cover plate 31 which can be swung from the position shown so as to obscure the scale which is not in use. For example, when using the English scale, the crank 11 is pushed toward the user so that pin 13 engages aperture 14. In this condition, cover 31 will be moved over scale 18 as shown in FIG. 2, so that only scale 3 is visible, and the possibility of an error due to reading the wrong scale is eliminated. A suitable mechanism for accomplishing this is shown, comprising link 32 which is pivoted at 33 to plate 26, and is actuated by transfer link 34, to which is attached finger 35, one end of which engages an annular groove 36 in disc 12, so as not to interfere with rotation of the crank 11, but to follow its axial motion, which is transferred through finger 35 engaging groove 36, to transfer link 34. It will thus be apparent that whenever the crank is in either extreme position, in which it is engaged with one or the other of the scale drive means, the cover 31 will conceal the other scale, which is not being used, from view of the user.

It will be apparent that the embodiments shown are only exemplary and that various modifications can be made in construction and arrangement within the scope of the invention as defined in the appended claims.

I claim:

1. A machine tool having
 (a) a rotatable shaft, a tool, and means controlled by rotation of the shaft for producing relative motion between the tool and a workpiece,
 (b) rotatable manual drive means for said shaft, slidable axially in one direction into a first operative position and in the other direction into a second operative position,
 (c) first movable scale indicating means having unit marks thereon and connected directly to said shaft, the scale marks being such that a unit rotation of the shaft produces a unit indication on said scale means,
 (d) second movable scale indicating means having different unit marks thereon from said first scale means and connected to said shaft through a motion conversion train such that a unit rotation of said second scale means produces a different amount of rotation of the shaft from the unit rotation corresponding to to first scale operation,
 (e) selectable driving connection means between said manual driving means and said scale means for connecting said drive means in its said first operative position with said first scale means and in its second operative position with said second scale means whereby a unit rotation of the drive means produces an amount of shaft rotation corresponding to a unit indication of the scale indicating means to which the drive means is connected,
 (f) said means controlled by rotation of the shaft producing a unit amount of relative motion between a tool and workpiece coresponding to the scale means which is connected, when that scale means indicates a unit amount of rotation of the manual driving means,
 (g) a cover means movable between two positions, in the first position obscuring said first scale indicator means and in the second position obscuring said second scale indicator means, and means linking said cover means and said drive means such that in said first axial position of the drive means the second scale indicating means is obscured and in the second axial position of the drive means the first scale indicating means is obscured.

2. The invention according to claim 1, said means (f) comprising a nut longitudinally movable on a thread in response to rotation of said shaft.

3. The invention according to claim 1, said manual drive means being a crank rotatable on said shaft.

4. The invention according to claim 3, said means for connecting comprising a first element fixed to said shaft for rotation therewith and a second element fixed to said second scale means for rotation therewith, a portion of said crank lying between said two elements and axially slidable from a position in engagement with either one of them, toward the other element, into a position between the two elements in which it is free of both elements.

References Cited

UNITED STATES PATENTS

| | | | |
|---|---|---|---|
| 1,027,549 | 5/1912 | Kronert | 33—166 |
| 1,444,565 | 2/1923 | Smith | 33—166 |
| 2,584,360 | 2/1952 | Montanus | 116—115.5 |
| 2,753,834 | 7/1956 | Bourguignon | 116—115 |
| 3,092,072 | 6/1963 | Strimel | 116—129 |
| 3,160,137 | 12/1964 | Simon | 116—115 |
| 3,315,633 | 4/1967 | Rabinow | 116—115.5 |

FOREIGN PATENTS

| | | |
|---|---|---|
| 112,213 | 10/1962 | Pakistan. |
| 317,568 | 12/1919 | Germany. |

LOUIS J. CAPOZI, *Primary Examiner.*

U.S. Cl. X.R.

33—166; 74—813